United States Patent [19]

Kraft et al.

[11] 4,299,583
[45] Nov. 10, 1981

[54] HYDRAULIC BELT TENSIONER CONSTRUCTION

[75] Inventors: Derald H. Kraft, Canton; Daniel M. Rinaldo, Akron, both of Ohio

[73] Assignee: Dyneer Corporation, Canton, Ohio

[21] Appl. No.: 90,002

[22] Filed: Oct. 31, 1979

[51] Int. Cl.³ .............................................. F16H 7/12
[52] U.S. Cl. ................................................... 474/110
[58] Field of Search ............... 474/101, 109, 110, 112, 474/111, 133, 134, 135, 136, 138; 92/121, 122; 60/481; 418/171, 61 B

[56] References Cited

U.S. PATENT DOCUMENTS

| | | | |
|---|---|---|---|
| 812,899 | 2/1906 | Thacher | 474/110 |
| 2,002,081 | 5/1935 | Dow | 474/110 |
| 2,025,572 | 12/1935 | Collingham | 92/121 X |
| 2,051,488 | 8/1936 | Kottlowski et al. | 474/135 X |
| 2,703,019 | 3/1955 | Burawoy | 474/138 |
| 3,052,294 | 9/1962 | Beachler | 474/110X |
| 3,132,596 | 5/1964 | Dinger | 474/117 |
| 3,142,193 | 7/1964 | Polko et al. | 474/110 |
| 3,187,674 | 6/1965 | Hammelmann | 474/109 X |
| 3,413,866 | 12/1968 | Ford | 474/138 |
| 3,631,734 | 1/1972 | Wagner | 474/117 |
| 3,680,982 | 8/1972 | Jacobellis | 92/121 X |
| 3,731,599 | 5/1973 | Allen | 92/122 |
| 3,768,324 | 10/1973 | Vanderstegen-Drake | 474/115 |
| 3,812,733 | 5/1974 | Yoshida | 474/138 |
| 3,855,872 | 12/1974 | Kakimoto | 474/112 X |
| 3,907,465 | 9/1975 | Dorff et al. | 418/171 X |
| 3,924,483 | 12/1975 | Walker et al. | 474/117 |
| 3,965,768 | 6/1976 | Foster | 474/135 |
| 3,975,965 | 8/1976 | Speer | 474/135 |
| 3,977,648 | 8/1976 | Sigmon | 92/121 X |
| 4,077,272 | 3/1978 | Busso | 474/135 X |
| 4,094,205 | 6/1978 | Cook | 474/109 X |
| 4,144,772 | 3/1979 | Bracklin | 474/135 |

Primary Examiner—C. J. Husar
Assistant Examiner—Conrad Berman
Attorney, Agent, or Firm—Frease & Bishop

[57] ABSTRACT

A hydraulic tensioning device for maintaining a predetermined amount of tensioning force on an endless drive belt of a vehicle accessories drive system. A housing is mounted in a fixed position on the engine in close proximity to the drive belt. A shaft is movably mounted within the housing by an elastomer block which biases the shaft in a belt tensioning rotational direction. A lever extends outwardly from the housing and is integrally connected to the shaft for pivotal movement upon rotation of the shaft. An expandable bladder or actuator is mounted in the housing and is engageable with the shaft and pivots the rotor and lever toward a belt tensioning direction when the bladder is expanded by hydraulic fluid. A hydraulic fluid supply and pump assembly supplies fluid under pressure to inflate the bladder. An idler pulley drivingly engages the fluid pump and is driven by the endless drive belt for actuating the pump. The elastomer block applies a pretensioning force on the drive belt with the hydraulically inflatable bladder supplying the major portion of the tensioning force when the vehicle engine is running. In one form of the invention, the fluid supply and pump assembly is mounted in the housing and the lever either moves a pivotally mounted vehicle accessory or moves an idler pulley into belt engagement to tension the belt. In another embodiment, the fluid supply and pump assembly is mounted on the extended end of the lever in engagement with an idler pulley which both tensions the belt and drives the fluid pump with the elastomer block, bladder and shaft being mounted in a fixed position on the engine.

19 Claims, 20 Drawing Figures

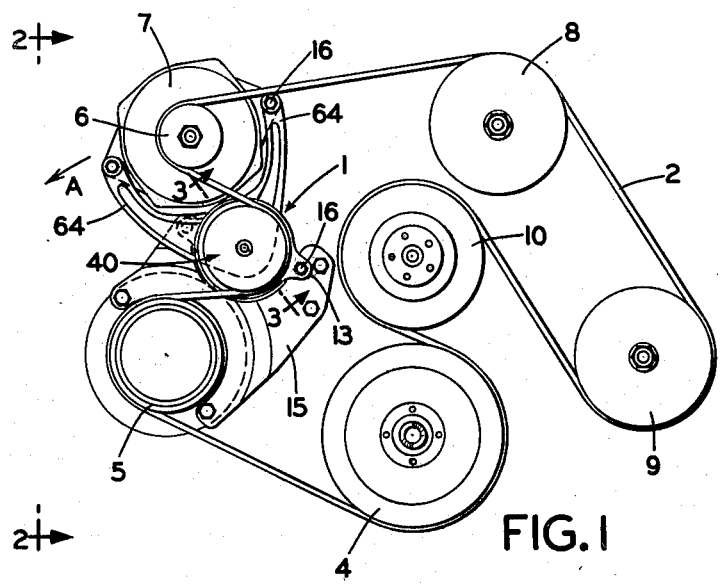
FIG.1
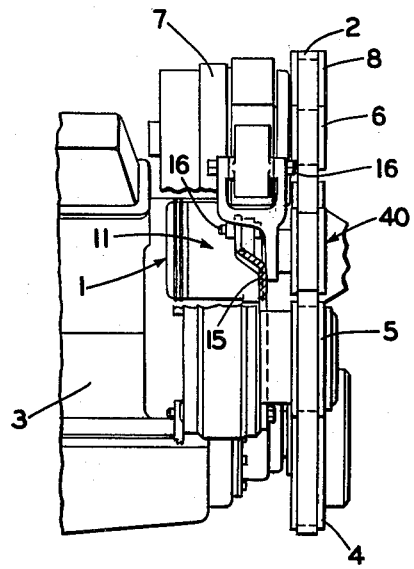
FIG.2
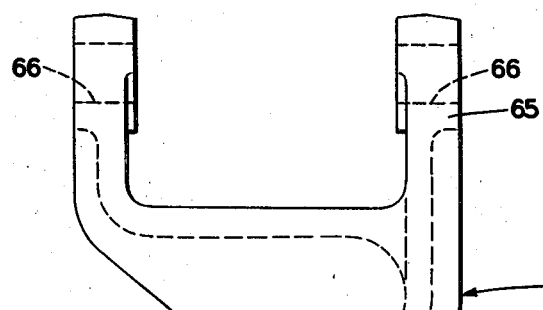
FIG.3
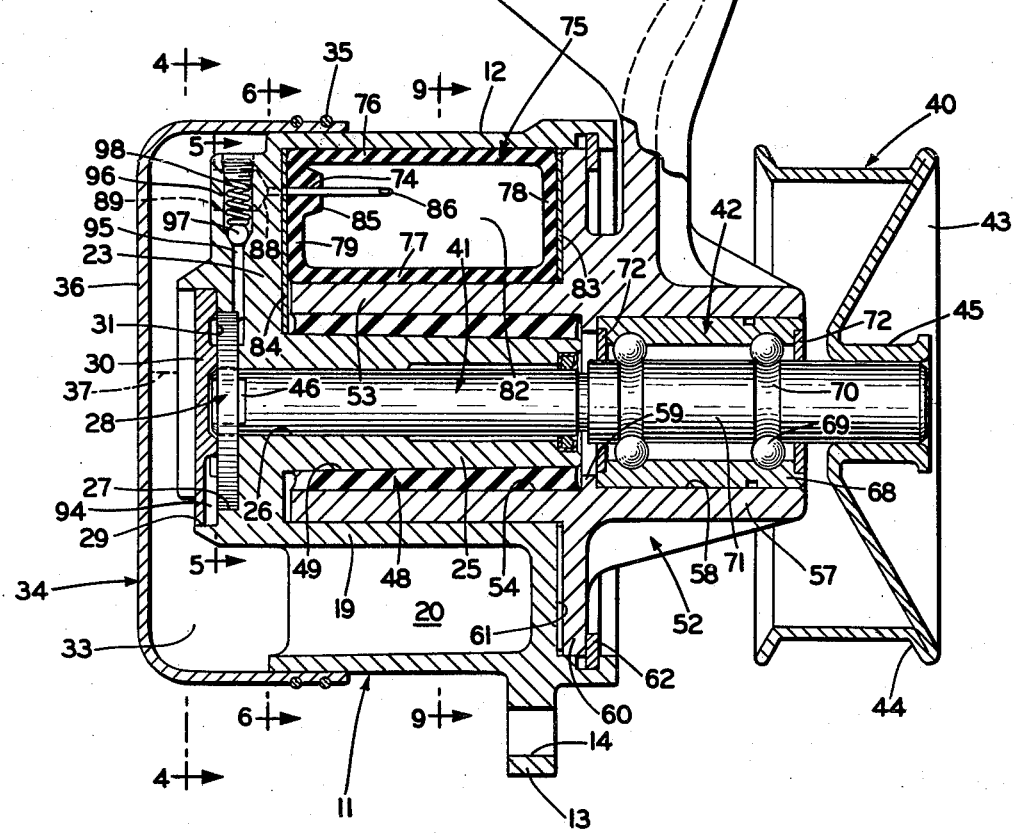

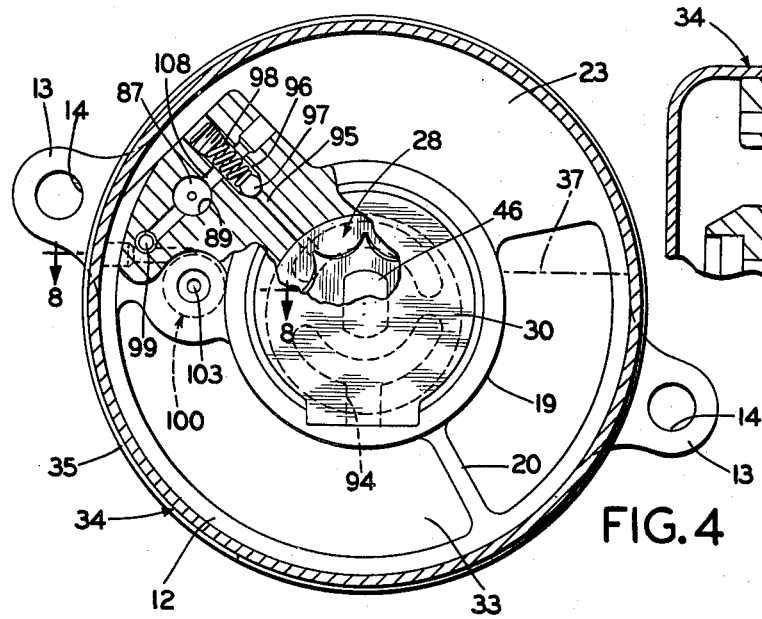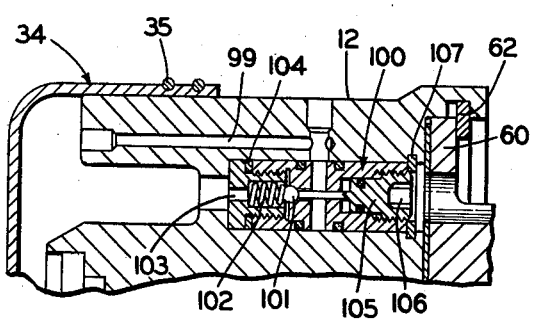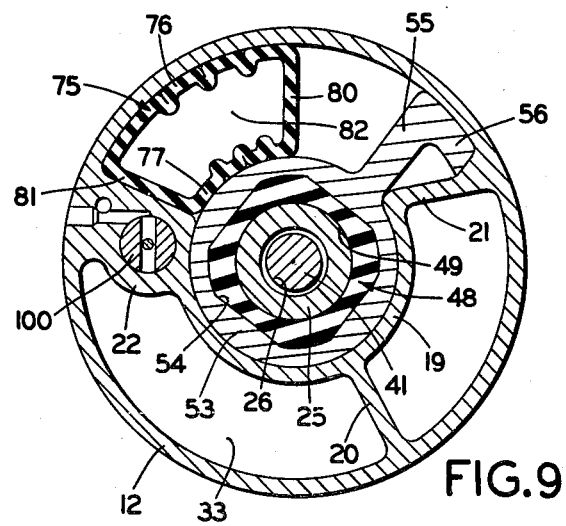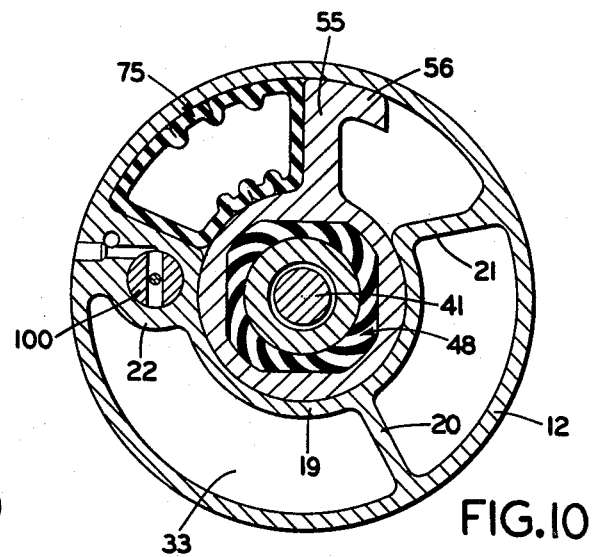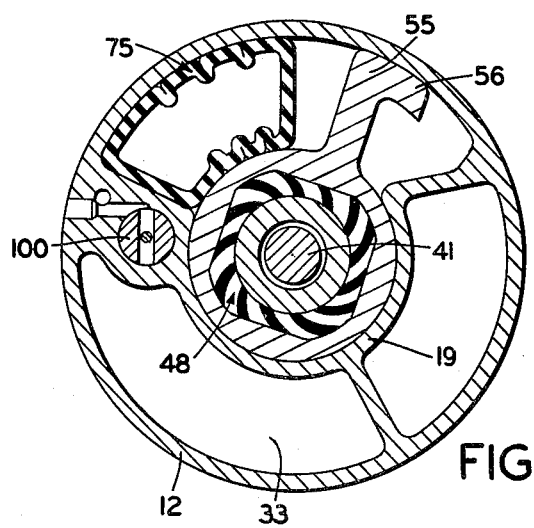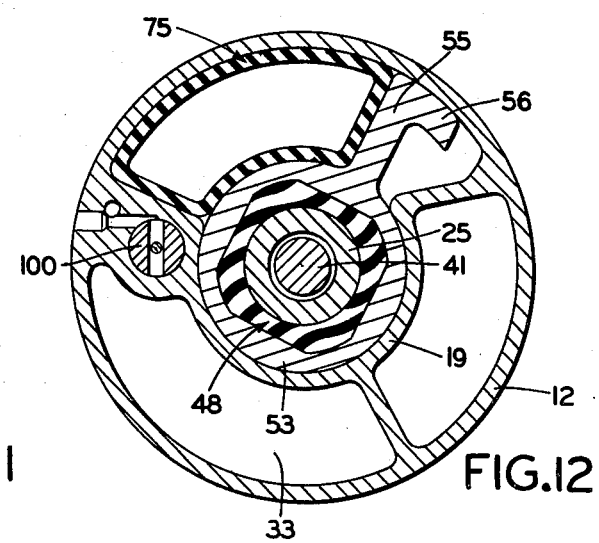

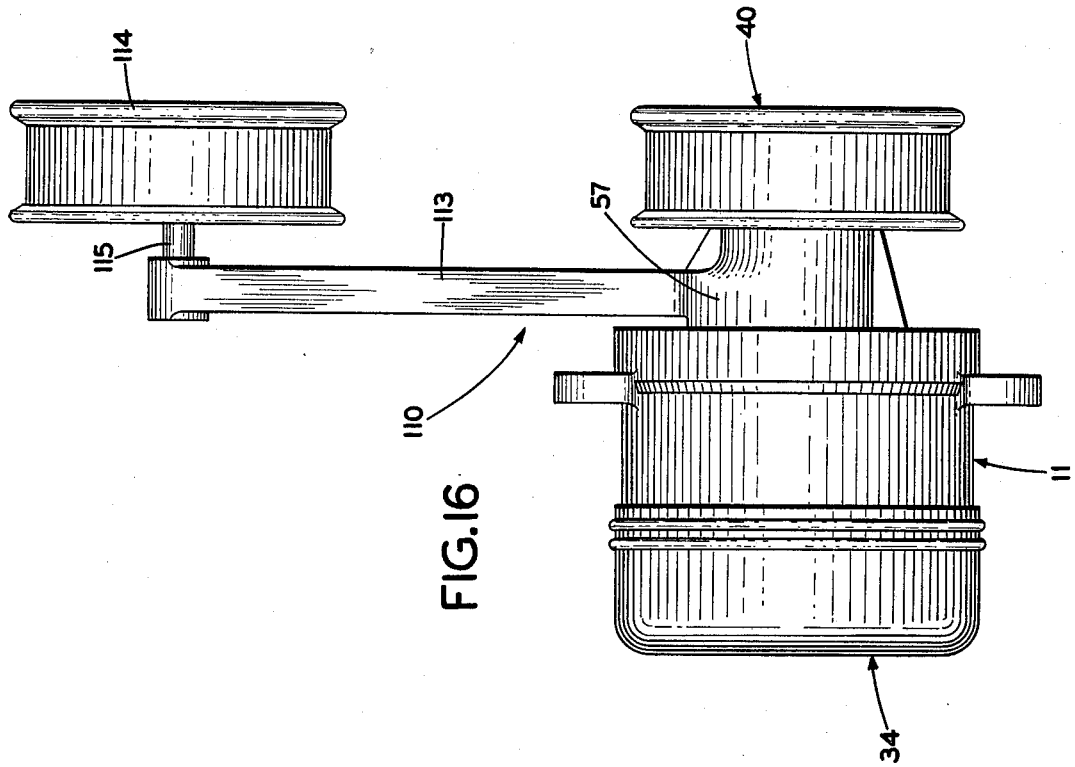
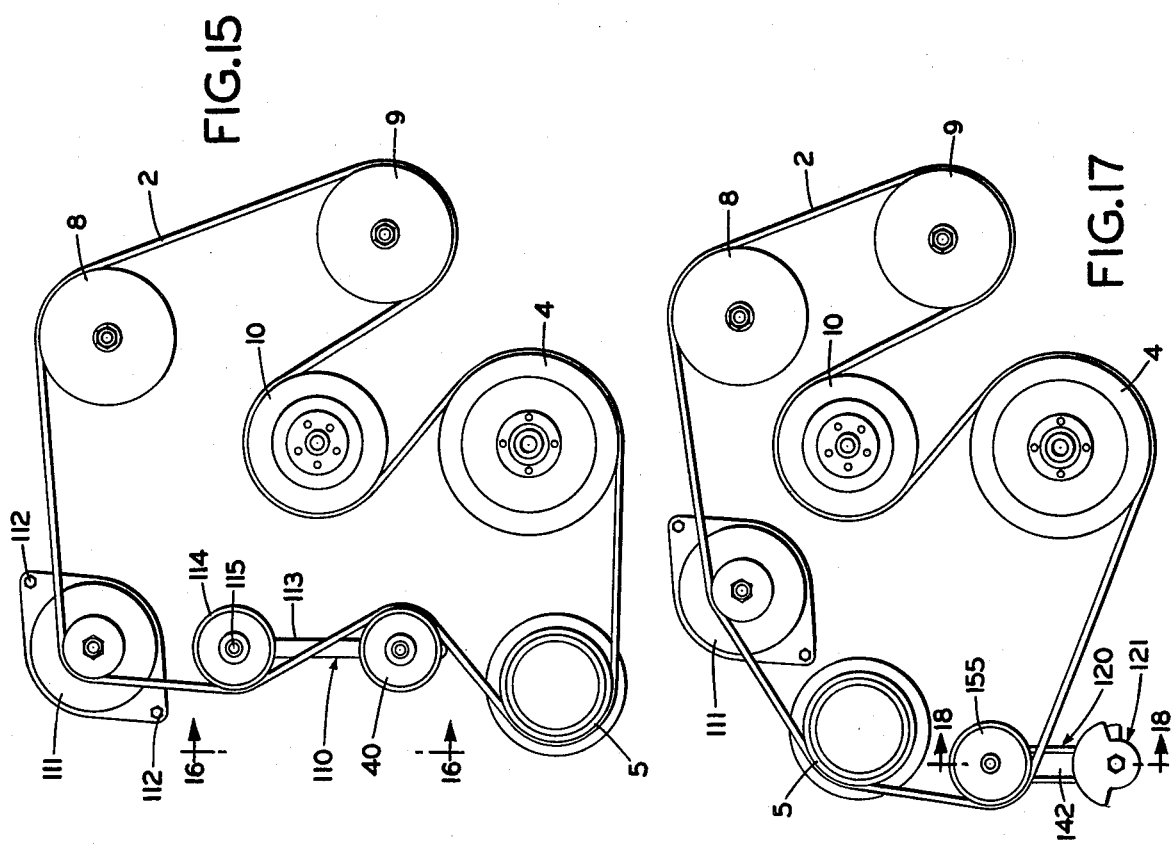

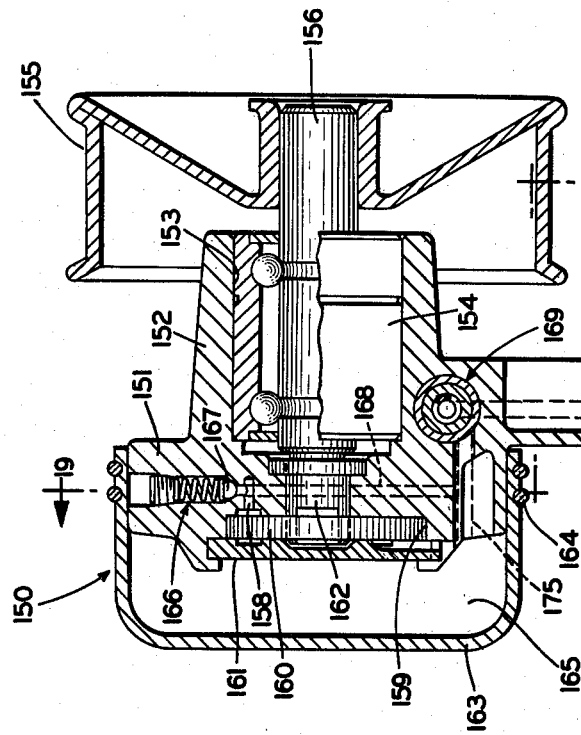
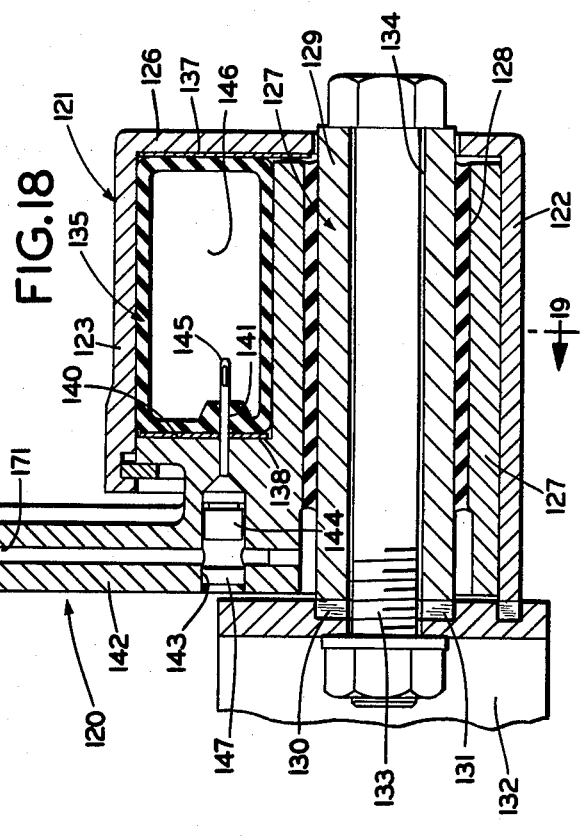
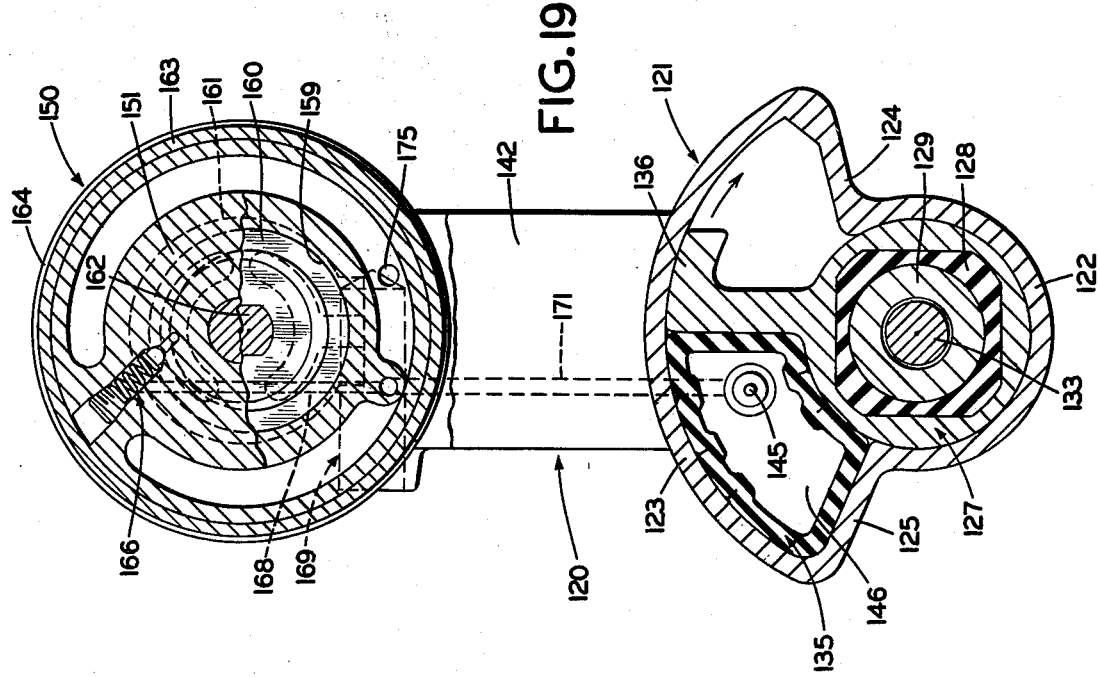

HYDRAULIC BELT TENSIONER CONSTRUCTION

BACKGROUND OF THE INVENTION

1. Field of the Invention

The invention relates to belt tensioning devices and arrangements, and in particular to a hydraulically actuated device for tensioning the endless drive belt of the drive system for vehicle accessories. More particularly, the invention relates to a belt tensioner having a self-contained hydraulic fluid supply-idler pulley-pump assembly driven by the endless belt, which maintains a predetermined constant tensioning force on the endless drive belt regardless of the engine operating condition, and which uses an elastomer generated force for applying a preload on the belt when the engine is not operating.

2. Description of the Prior Art

There is the trend today in the automobile industry to operate the various vehicle accessories, such as the power steering pump, oil and air pumps, air conditioning and alternator, by a single endless belt driven by a pulley connected to the engine crankshaft. This system is referred to as a "serpentine" drive belt system. To insure optimum operating efficiency for these various accessories, it is necessary that the drive belt be maintained at a predetermined tension to assure efficient performance of the accessories as well as satisfactory service life for the belt. Due to the relatively greater length for the single drive belt which replaces the heretofore plurality of smaller belts, there is a greater tendency for the belt to stretch, which will affect the operating characteristics of the driven accessories. Therefore, it is desirable that an automatic belt tensioning device be used for these endless belts to provide reliable service over an extended period of time and to maintain a constant amount of tension on the belt regardless of the amount of belt stretch without requiring any maintenance or manual adjustment.

Numerous devices have been proposed and used to accomplish this purpose. One type of tensioner uses a bushing formed of an elastomeric material which is placed in shear, tension or compression by some mechanical means for continuously exerting a tensioning force on the belt. Examples of belt tensioners using an elastomer are shown in U.S. Pat. No. 3,975,965 and 4,144,772. Tensioner constructions using an elastomeric material only, have the disadvantages in that they exert a high load rate on the belt which results in a rapid loss of tensioning as the belt stretches, and limits the stroke of the belt-engaged idler pulley to a shorter distance than desired. Also, sudden acceleration and deceleration of the drive belt can cause a whipping action to occur which creates a time lag before full damping is achieved.

Numerous other types of belt tensioning devices use springs for applying and/or maintaining the tensioning force on a belt-engaging idler pulley or chain-engaging sprocket. Some examples of these types of constructions are shown in U.S. Pat. Nos. 2,703,019, 2,893,255, 3,413,866, 3,631,734, 3,768,324, 3,812,733, 3,924,483 and 3,965,768. Also, some spring-actuated tensioning devices use the biasing force of a spring in combination with hydraulic actuated members for regulating the amount of tensioning force applied to the belt, depending on whether the engine is running or shut off.

U.S. Pat. No. 2,051,488 shows a chain tensioning device in which a hydraulic cylinder is actuated when the engine is running to reduce the tensioning pressure which is exerted on the drive chain by a biasing spring. This hydraulic cylinder applies a counter force to the biasing action of the spring when the engine is running in order to decrease the tensioning force on the chain, whereupon the full biasing force of the spring is exerted on the chain when the engine is off and the hydraulic cylinder inactive. U.S. Pat. No. 3,142,193 discloses another belt tensioner using a hydraulically actuated bellcrank and belt-engaging pulley in which a spring biases the pulley into tensioning engagement with the belt until the engine is operating, whereupon the hydraulic actuated piston imparts a greater tensioning force to the pulley through the bellcrank. When the engine stops, the piston retracts and the spring maintains a lesser tensioning force on the belt.

U.S. Pat. No. 4,077,272 discloses another belt tensioner using both a spring and a hydraulic member to achieve the desired tensioning characteristics. In this device, when the engine is running, hydraulic oil from the engine lubricating system forces a piston back into its cylinder to overcome an internally mounted first spring so that only a second spring acts on the belt tensioning pulley when the engine is operating. When the engine is off, both springs act on the belt tensioning pulley. U.S. Pat. No. 3,132,596 shows a belt tensioner using a hydrostatic snubber controlled by the power steering pump of the vehicle, whereupon the snubber is forced outwardly in direct relationship to the output pressure of the power steering pump. This mechanism does not maintain a constant pressure on the belt when the vehicle engine is both on and off, and will apply different forces in relationship to the engine speed.

Many of these spring, elastomeric and hydraulic actuated devices are believed to perform satisfactorily for their intended purpose. However, the use of springs for applying the tensioning force on a drive belt or chain, or for applying or retracting a tensioning member therefrom, presents problems. The operating characteristics of these springs will change over the life of the spring and in response to changes in ambient temperature. Also, as the drive belt stretches, the spring's biasing effect changes, making it difficult to maintain a constant tensioning force on the drive belt. Likewise, the springs may become rusted and corroded and break during the life of the vehicle, presenting mechanical maintenance problems for the vehicle owner.

Many hydraulic actuated belt tensioners use the hydraulic fluid which is used for other purposes in the engine for operation of the belt tensioners, such as the low-pressure engine lubricating oil or the higher-pressure power steering fluid. Some vehicle manufacturers prefer not to use this engine hydraulic fluid for the operation of the belt tensioner. Since this presents a possible problem situation in that if a serious leak occurs, it could affect the other operations of the vehicle and possibly damage or ruin an engine if not detected.

Also, some vehicle manufacturers desire a belt tensioning device which tensions the belt by pivotally moving one of the vehicle accessories. Other manufacturers prefer a tensioning device which can be mounted as a complete unit on the engine and automatically tension the drive belt by direct engagement therewith without pivotally mounting one of the vehicle accessories. This type of tensioner provides a certain amount of flexibility in engine design since the tensioning unit may be mounted at various locations for engaging the belt and does not rely on the pivotal mounting of one of the accessories.

Many of these problems are believed to be eliminated by the improved hydraulic belt tensioner constructions shown in the copending applications of Deral H. Kraft, one of the coinventors of this application, Ser. Nos. 063,205 and 063,828, filed Aug. 3 and 6, 1979, respectively, both assigned to the same assignee as is the present application. These improved belt tensioners have their own self-contained hydraulic fluid reservoir and supply, and apply tensioning force on the belt by pivotally moving one of the vehicle accessories or by an idler pulley engaging the belt as part of a complete tensioning unit.

Accordingly, it is desirable to provide a belt tensioning device and arrangement which eliminates the use of springs for controlling the belt tensioning force, which device will maintain a nearly constant predetermined tension on the belt throughout the belt life and regardless of whether the engine is on or off or being driven at high or low speeds, which device uses a source of hydraulic fluid completely independent of the vehicle hydraulic system for its operation, and which permits flexibility in installation by pivotally moving one of the vehicle accessories for tensioning the drive belt which is operatively engaged with said accessory, or else by directly engaging the belt by an idler pulley which is moved into belt tensioning engagement by the hydraulic actuation of the tensioner.

There is no known belt tensioning device of which I am aware which imparts and maintains a nearly constant predetermined tensioning force on an endless drive belt by a hydraulically actuated member which is actuated by hydraulic fluid from a self-contained fluid supply reservoir completely independent of the vehicle hydraulic fluid system, which maintains this constant pressure on the belt whether the engine is on or off or operating at various speeds, which prevents belt whip and achieves a highly efficient damping effect, which may or may not require movement of one of the vehicle accessories to achieve the tensioning effect, and which mechanically applies a pretensioning force on the belt.

SUMMARY OF THE INVENTION

Objectives of the invention include providing a hydraulic belt tensioner construction which is actuated from a source of hydraulic fluid completely separate and independent of the vehicle accessory drive system and at a predetermined pressure regardless of the operating condition of the vehicle's engine. Another object is to provide such a belt tensioner having a hydraulically inflatable bladder which rotates a lever operatively engaged therewith to tension the drive belt by engagement with an idler pulley that is rotatably mounted on the swinging end of the lever, or by engagement of the belt with a pulley mounted on and operatively engaged with a self-contained fluid supply and pump assembly also mounted on the swinging end of the lever. Another object is to provide such a belt tensioner having a check valve system which prevents the escape of hydraulic fluid from the inflatable bladder to maintain constant pressure on the tensioning lever, thereby providing a damping effect and eliminating belt whip upon starting and stopping of the vehicle engine or upon rapid engine acceleration or deceleration. Another object is to provide such a belt tensioner having a shaft integrally connected to the lever in which the shaft is operatively connected to a block of an elastomer material which biases the shaft and lever in a belt tensioning direction, whereby a pretensioning force is applied to the drive belt prior to the inflatable bladder applying the full hydraulic actuated tensioning force thereon to ensure that the belt has a sufficient tension for operation of the vehicle accessories even if the hydraulic system is inoperable. Another object is to provide such a belt tensioner in which the inflatable bladder is mounted within a housing that is adapted to be mounted in a fixed position adjacent the drive belt with the self-contained fluid supply and pump assembly also being located within the housing, or alternatively with the self-contained fluid supply and pump assembly being mounted within a separate housing located on the swinging end of the lever and hydraulically connected with the inflatable bladder by a fluid passage formed in the lever. Another object is to provide such a belt tensioner in which stop means are provided in the housing adjacent the inflatable bladder which is engaged by the rotor upon the bladder being inflated to a maximum position. Another object is to provide such a belt tensioner having a self-contained supply of hydraulic fluid which is separate from the engine lubricating fluid or power steering fluid, and in which this fluid is pumped into the inflatable bladder by a relatively inexpensive gear pump unit which is driven by the endless drive belt of the accessory drive system. Another object is to provide such a belt tensioner in which the hydraulic pressure exerted by the inflatable bladder can be changed easily to conform to specific operating characteristics required by various vehicles by replacing or adjusting a simple high-pressure control check valve in the pump unit. Another object is to provide such a belt tensioner which is of a relatively simple construction, which achieves the stated objectives in a simple, effective and relatively inexpensive manner, and which solves problems and satisfies needs existing in the art.

These objectives and advantages are obtained by the improved hydraulic belt tensioner construction for automatically tensioning an endless belt of the drive system for the vehicle accessories, the general nature of which may be stated as including a housing; shaft means movably mounted within the housing, said shaft means having a lever portion extending outwardly from said housing adapted to operatively engage the endless drive belt and apply a tensioning force on said belt when the lever portion is moved in a belt tensioning direction; elastomer means mounted within the housing and engageable with the shaft means biasing the lever portion in a belt tensioning direction; expandable bladder means mounted within the housing and engageable with the shaft means; a fluid supply communicating with the bladder means; and pump means for supplying fluid to the bladder means under pressure to expand said bladder means into engagement with the shaft means moving the shaft means and the lever portion in the belt tensioning direction.

BRIEF DESCRIPTION OF THE DRAWINGS

Preferred embodiments of the invention illustrative of the best modes in which applicants have contemplated applying the principles are set forth in the following description and are shown in the accompanying drawings, and are particularly and distinctly pointed out and set forth in the appended claims.

FIG. 1 is a diagrammatic view looking toward the front of an engine illustrating an endless drive belt operatively connected to and driving the vehicle accessories, having one form of the improved belt tensioner incorporated therein;

FIG. 2 is an end elevational view of the drive belt arrangement looking in the direction of arrows 2—2, FIG. 1;

FIG. 3 is an enlarged sectional view taken on line 3—3, FIG. 1, showing the belt tensioner of FIGS. 1 and 2 removed from its engine mounting bracket;

FIG. 4 is a sectional view taken on line 4—4, FIG. 3;

FIG. 8 is an enlarged fragmentary sectional view taken on line 8—8, FIG. 4, of the high-pressure/manual relief valve assembly;

FIG. 9 is a reduced sectional view taken on line 9—9, FIG. 3, showing the position of the shaft and elastomer block at time of assembly prior to placing the elastomer block in tension;

FIG. 10 is a sectional view similar to FIG. 9 showing the position of the shaft after the elastomer block is placed in full tension prior to tensioning engagement with the drive belt;

FIG. 11 is a sectional view similar to FIGS. 9 and 10 showing the position of the shaft and elastomer block when in a preload belt tensioning position prior to hydraulic actuation by the expandable bladder;

FIG. 12 is a sectional view similar to FIGS. 9, 10 and 11 showing the usual operating position of the shaft and expandable bladder when tensioning the drive belt;

FIG. 15 is a diagrammatic view looking toward the front of an engine similar to FIG. 1 showing a second embodiment of the improved belt tensioner construction operatively engaging the endless drive belt;

FIG. 16 is an enlarged elevational view looking in the direction of arrows 16—16, FIG. 15, showing the second embodiment of the improved belt tensioner construction removed from the engine;

FIG. 17 is a diagrammatic view looking toward the front of an engine similar to FIGS. 1 and 15 showing a third embodiment of the improved belt tensioner construction operatively engaging the endless drive belt;

FIG. 18 is an enlarged sectional view taken on line 18—18, FIG. 17;

FIG. 19 is an enlarged sectional view taken on line 19—19, FIG. 18; and

DESCRIPTION OF THE PREFERRED EMBODIMENTS

First Embodiment

Figure 5:
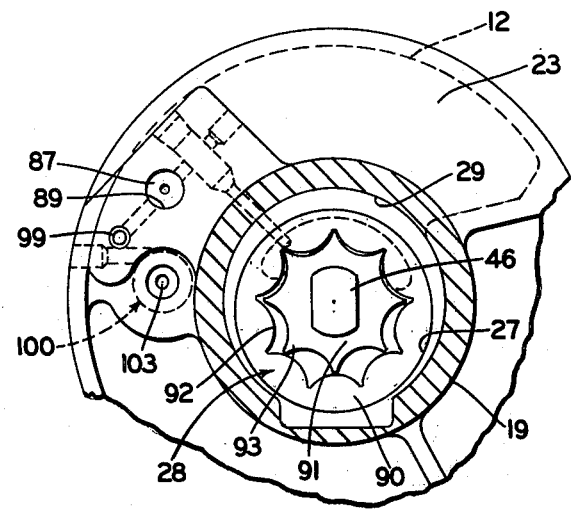
FIG. 5 is a fragmentary sectional view taken on line 5—5, FIG. 3.

Referring to FIG. 1 of the drawings, the first form of the improved belt tensioner construction is shown diagrammatically in cooperation with a vehicle accessories drive system. The improved hydraulic belt tensioner used in the particular tensioning arrangement is indicated generally at 1, and is shown tensioning an endless drive belt 2 of the power transmission belt drive system. The accessories drive system consists of a plurality of belt pulleys or sheaves having configurations and diameters determined by and associated with engine accessory components and their locations relative to each other. The various pulleys are supported on their respective engine components which in turn are mounted on an engine 3 in a usual manner known in the art. Belt 2 preferably operates in a single vertical plane, as shown in FIG. 2, to eliminate binding and skewing of the belt.

The particular engine accessories drive system shown in FIG. 1 consists of a main driving pulley 4 which is operatively connected to the main drive shaft of the engine, a pulley 5 which is operatively connected to the air conditioning motor, a pulley 6 which is operatively connected to an alternator 7 which provides the electrical power for the engine, a pulley 8 which is operatively connected to the engine air pump, a pulley 9 which is operatively connected to the vehicle's power steering unit and a pulley 10 which is operatively connected to the engine water pump. Alternator 7 is pivotally mounted on belt tensioner 1, whereby belt tensioner 1 pivots alternator 7 in a counterclockwise direction (Arrow A, FIG. 1) for tensioning belt 2 through its driving engagement with pulley 6.

Figure 6:
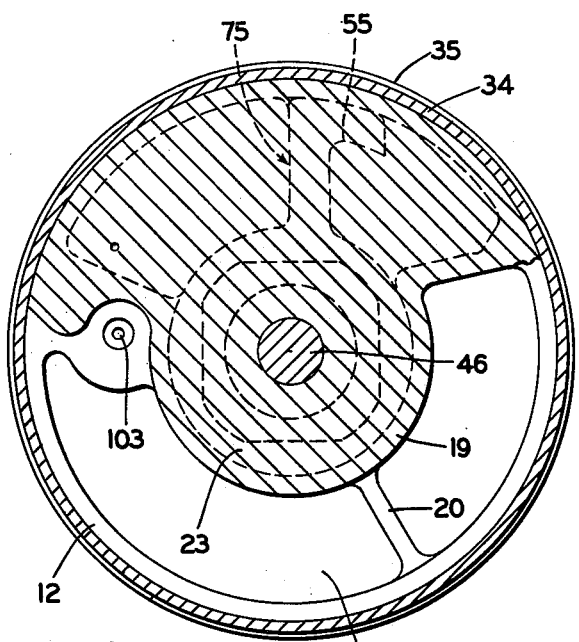
FIG. 6 is a sectional view taken on line 6—6, FIG. 3.

Belt tensioner 1 includes a housing, indicated generally at 11 (FIGS. 3–6), which is formed of an integral one-piece casting, preferably aluminum or similar lightweight material. Housing 11 has an outer cylindrical-shaped wall 12 which is provided with a pair of outwardly extending mounting lugs 13 formed with openings 14 for mounting tensioner 1 on an engine mounting bracket 15 by bolts 16 (FIGS. 1, 2 and 4). Housing 11 further includes a partial cylindrical-shaped inner wall 19 which is concentric with outer wall 12 (FIGS. 3, 6 and 9) and integrally connected thereto by a plurality of radially extending members 20, 21 and 22 and by an irregular-shaped end wall 23. An inner cylindrical-shaped sleeve 25 extends inwardly from end wall 23 and is concentric to and spaced radially from inner housing wall 19. Sleeve 25 is formed with an axially extending central bore 26 which extends completely through end wall 23.

A circular recess 27 (FIGS. 3 and 5) is formed in end wall 23 concentric with sleeve bore 26, in which is mounted a gear pump, indicated generally at 28, the details of which are discussed below. A second or outer circular recess 29 is formed concentrically with inner recess 27 for receivably mounting a pressure plate 30 which encloses recess 27 and forms an enclosed pump chamber 31 for gear pump 28. A fluid reservoir 33 is formed between portions of housing outer wall 12 and inner wall 19 and between end wall 23 and an end cap 34. End cap 34 has a generally cup-shaped configuration (FIG. 3) and is mounted on outer housing wall 12 by a pair of banding rings 35. Cap end wall 36 is spaced from housing end wall 23 forming fluid reservoir 33 therebetween, which is adapted to contain a supply of hydraulic fluid 37, preferably oil.

An idler pulley 40 is rotatably mounted on housing 11 by a shaft indicated generally at 41, and a bearing assembly 42. Idler pulley 40 includes a usual sheet metal pulley member 43 having a belt-engaging groove 44 formed in the outer periphery thereof and a shaft-receiving hub 45 in which the outer end of shaft 41 is telescopically mounted and secured thereto by a press fit or similar fastening means. The innermost end of shaft 41 is drivingly engaged with gear pump 28 by a flat-sided stub shaft 46 for actuation of pump 28 upon rotation of pulley 40 and connected shaft 41.

Figure 7:
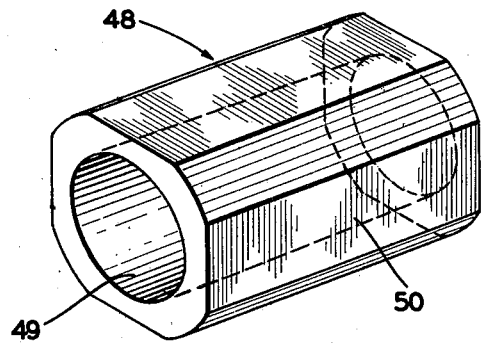
FIG. 7 is a perspective view of the elastomer block.

In accordance with one of the features of the invention, a block formed of an elastomeric material, indicated generally at 48 (FIG. 7) is mounted on the outer surface of sleeve 25 within housing 11. Block 48 has a generally annular, tubular-like configuration formed with a cylindrical-shaped inner bore 49 and a generally hexagonal-shaped outer surface 50. Block 48 is bonded to the outer surface of sleeve 25 by an adhesive or molded thereto to prevent relative movement between block 48 and sleeve 25.

A shaft, indicated generally at 52, is movably mounted within housing 11 on elastomer block 48. Shaft 52 (FIG. 3) includes an axially extending tubular sleeve portion 53 which is formed with an inner bore 54 having a hexagonal configuration complementary to the hexagonal outer surface 50 of block 48. An actuator bar 55 (FIG. 9) is formed integrally with shaft sleeve 53 and extends radially outwardly therefrom. Bar 55 also extends axially along sleeve 53 generally throughout the length of sleeve 53. The outer end of actuator bar 55 terminates in a circumferentially extending projection 56 which functions as a stop for the shaft upon the rotor reaching its maximum position, as described in detail below.

Shaft sleeve 53 terminates in a bearing housing portion 57 which includes an internal cylindrical bore 58 which is separated from sleeve bore 54 by a radially inwardly projecting annular rib 59. An annular flange 60 extends radially outwardly from an area generally adjacent the junction of sleeve portion 53 and bearing housing portion 57. Flange 60 is seated within a circular recess 61 formed in the end of housing 11 and is retained therein by an annular retaining ring 62. Shaft 52 further includes a radially outwardly extending lever 63 which is formed integrally with bearing housing portion 57. In the particular embodiment of the invention shown in FIGS. 1–13, lever 63 is a yoke-like bracket having a pair of outwardly curved arms 64 (FIG. 1), both of which terminate in a U-shaped bracket 65 having mounting holes 66 formed in the ends thereof through which bolts 16 extend for mounting alternator 7 on belt tensioner 1.

Bearing assembly 42 is telescopically received within bearing housing bore 58 and is in abutment with internal rib 59. Bearing assembly 42 may have various configurations than the particular arrangement shown in the drawings, if desired. The particular bearing assembly shown includes an outer race 68 containing a plurality of spaced bearing walls 69 which are seated in annular grooves 70 formed in outer pulley shaft portion 71. A pair of bearing lubricating seals 72 may be mounted in grooves 70 formed in the ends of outer race 68.

Figure 14:
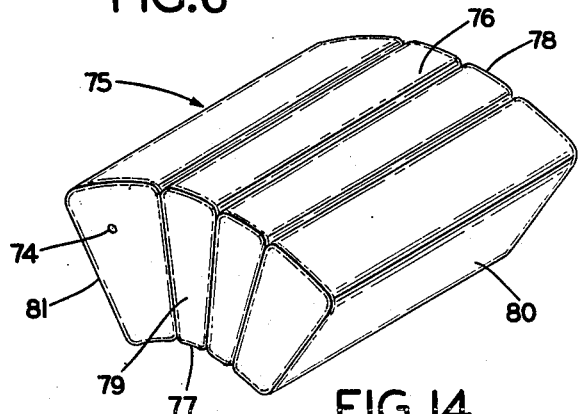
FIG. 14 is a perspective view of the inflatable hydraulic actuator bladder.
Figure 13:
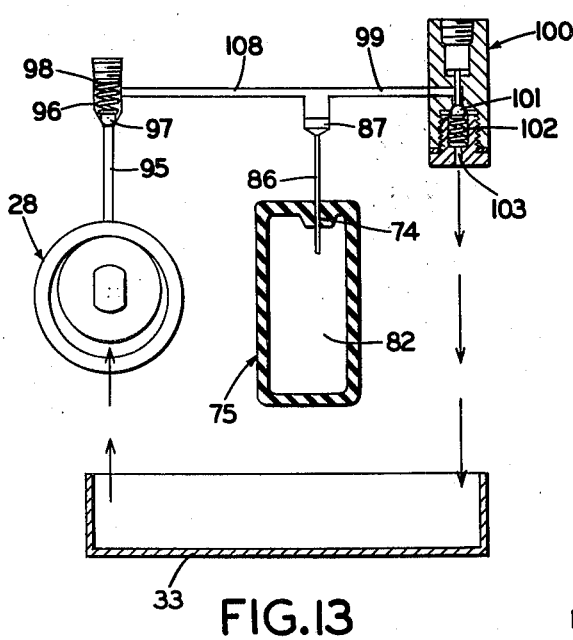
FIG. 13 is a diagrammatic view showing the hydraulic fluid flow and check valve system of the tensioner construction shown in FIGS. 1-12.

In accordance with another feature of the invention, an inflatable actuator, indicated generally at 75, is mounted within housing 11 for engagement with actuator bar 55 of shaft 52 for pivotally moving lever 63 in a belt tensioning direction to apply a predetermined constant tensioning force on drive belt 2 (FIG. 14). Actuator 75 has a hollow bladder-like configuration and preferably is formed of a woven fabric base with an elastomer sealant overcoat providing a fluid-tight inflatable expandable chamber which is resistant to hydraulic fluid, oil, gas and similar fluids. Actuator 75 is formed by a spaced pair of curved top and bottom walls 76 and 77, curved side walls 78 and 79, and a pair of spaced inwardly extending end walls 80 and 81 which form a fluid-receiving chamber 82 therebetween. Walls 76 and 77 abuttingly engage a portion of housing wall 12 and a portion of shaft sleeve 53, respectively (FIG. 9); walls 78 and 79 are located adjacent shaft flange 60 and housing end wall 23, respectively (FIG. 3); and end walls 80 and 81 abuttingly engage actuator bar 55 and radial wall member 22, respectively (FIG. 9).

Actuator walls 78 and 79 preferably are separated from shaft flange 60 and the inside surface of housing end wall 23 by a pair of slide shims 83 and 84, respectively. Shims 83 and 84 are formed of a friction-reducing material, such as "fish paper" or the like, which provides smooth sliding surfaces for actuator walls 78 and 79 as actuator 75 is expanded by the hydraulic fluid from reservoir 33 in the manner described below. Actuator walls 76–79 are formed by a plurality of pleated wall panels which provide the expandable accordion-type structure of actuator 75, as shown in FIG. 14.

The inside surface of actuator wall 79 is formed with an inwardly projecting boss 85 (FIG. 3) formed with a hole 74 through which extends a stem 86 of an air needle 87. Base portion 88 of air needle 87 is mounted within a complementary-shaped recess 89 (FIGS. 3 and 5) formed in housing end wall 23, for injecting hydraulic fluid into chamber 82.

Gear pump 28 is a positive displacement pumping unit (FIG. 5) comprising outer and inner gears 90 and 91, with outer gear 90 being formed with a plurality of inwardly projecting teeth 92 and inner gear 91 being formed with a plurality of outwardly projecting teeth 93. Outer gear 90 has one tooth more than the number of gear teeth 93 of inner gear 91. This pump arrangement is referred to as an internal gear pump and is of the type distributed under the trademark GEROTOR by the Nichols Portland Division of W. H. Nichols Company. In this type of pumping mechanism, fluid is drawn into one of the chambers formed between pairs of inner and outer teeth, and as the chambers expand upon rotation, it is passed from one chamber to another chamber until being discharged through an outlet opening. Upon one complete revolution of inner gear 91, inner gear 91 will have advanced one tooth with respect to outer gear 90.

Hydraulic fluid is supplied to actuator 75 from reservoir 33 through an inlet opening 94 formed in pressure plate 30 and is moved through the alternating, expanding and contracting chambers formed between gear teeth 92 and 93 of gear pump 28 when the pump is driven by the rotation of pulley 40. The fluid discharged from pump 28 flows through a passage 95 (FIGS. 3 and 4) and into a cavity 96 of a ball check valve having a ball 97 and a biasing spring 98. This fluid then flows through a portion of another fluid passage 108 and through stem 86 of needle 87 and into fluid chamber 82 of actuator 75.

Hydraulic fluid will continue to flow into actuator chamber 82 until the predetermined pressure is reached and actuator 75 inflated to this pressure. The excess fluid then will flow from check valve cavity 96 through passage 108 past needle 87 and through a fluid passage 99 (FIGS. 5 and 8) and into a high-pressure/manual relief valve assembly, indicated generally at 100. A valve ball 101 will prevent discharge of the hydraulic fluid from relief valve assembly 100 until the predetermined pressure is reached in actuator 75, whereupon the pressure exerted on ball 101 overcomes the preset biasing force of its spring 102 permitting the fluid to flow through the check valve cavity and through an outlet opening 103 back into fluid reservoir 33. Thus, when the vehicle engine is running, drive belt 2 will rotate idler pulley 40 actuating gear pump 28 which continuously pumps fluid from reservoir 33 either into actuator chamber 82 or through relief valve assembly 100, where it is discharged through opening 103 and returned to reservoir 33 for reuse.

The operation of improved belt tensioner construction 1 is shown particularly in FIGS. 9-13. FIG. 9 shows the position of actuator bar 55 and actuator 75 when elastomer block 48 is assembled with shaft 52 without block 48 being placed under stress. In this position actuator bar projection 56 abuts against radial member 21. FIG. 10 shows elastomer block 48 after being placed under stress by manual pivotal movement of actuator bar 55 and lever 63 in a clockwise direction (FIG. 1) and a counterclockwise direction (FIGS. 9-12). Upon release of lever 63, the deformation of elastomer block 48 will move lever 63 in a counterclockwise direction (FIG. 1), tensioning belt 2 by its engagement with alternator pulley 6. Belt 2 is placed about pulley 6 after lever 63 and actuator bar 55 have been moved to the position of FIG. 10 before releasing the manual retaining force thereon. This permits actuator bar 55 and lever 63 to move to the preload belt tensioning position of FIG. 11.

Only a portion of the desired belt tensioning force is exerted on belt 2 when actuator bar 55 is in the position of FIG. 11. This preload tensioning force exerted by elastomer block 48 applies sufficient tension on belt 2 so that the belt will be sufficiently tensioned for operation of the pulley-driven accessories. Immediately upon engine start up, belt 2 will rotate pulley 40 actuating pump 28, hydraulically expanding actuator 75 to the position of FIG. 12, as described above. FIG. 12 shows the usual operating position of tensioner 1 in which actuator 75 applies the predetermined amount of additional force against actuator bar 55, moving it from its preloaded position of FIG. 11 to its normal operating position of FIG. 12. Relief valve assembly 100 opens upon the predetermined pressure being exerted against actuator bar 55 by actuator 75.

The amount of pressure exerted by elastomer block 48 on actuator bar 55 is reduced considerably upon bar 55 moving from its preloaded position of FIG. 11 to the fully loaded tensioning position of FIG. 12. The amount of force exerted by block 48 becomes almost negligible as actuator bar 55 moves from its position of FIG. 12 in a clockwise direction as belt 2 stretches until projection 56 abuts against stop member 21, as shown in FIG. 9. Thus, the tensioning force exerted on belt 2 is nearly constant during the belt life and is developed hydraulically by actuator 75. Actuator bar projection 56 may not abut against stop member 21 throughout the belt life, but is provided to prevent damage to actuator 75 in the event of a belt breakage or excess belt stretch.

Relief valve assembly 100 (FIGS. 8 and 13) enables the desired operating pressure applied to actuator 75 to be adjusted for use of tensioner 1 in various vehicles and for different belt arrangements. This operating pressure can be adjusted by either replacing spring 102 with another spring having a different operating characteristic or by varying the thickness of adjustment shims 104. Increasing the thickness of shims 104 will decrease the amount of compression of spring 102, thereby reducing the amount of hydraulic pressure required to unseat valve ball 101 for discharging hydraulic fluid from assembly 100. Valve assembly 100 also enables the hydraulic pressure to be released from acting on actuator bar 55 and on lever 63 when performing maintenance on belt 2 or one of the vehicle accessories. Plunger 105 is manually rotated by inserting a tool in a socket opening 106 formed in the end of plunger 105 after removal of retaining ring 107. Advancement of plunger 105 unseats ball 101 enabling the hydraulic fluid to flow freely through assembly 100 and out of actuator 75 releasing the pressure on bar 55.

Second Embodiment

A modified form of the invention is shown in FIGS. 15 and 16 and is indicated generally at 110, and is shown diagrammatically in FIG. 15 tensioning drive belt 2. FIG. 15 shows a type of drive belt arrangement in which modified belt tensioner 110 may be used. The arrangement shown in FIG. 15 is similar to that of FIG. 1 except that an alternator 111 is mounted in a fixed position on the engine by bolts 112 instead of being pivotally mounted on lever 63 of tensioner 1, as described above. The remaining vehicle accessories will remain the same as those described above with respect to FIG. 1, and accordingly, are not specifically set forth.

Belt tensioner 110 provides a unit which can be mounted adjacent the vehicle engine at a variety of locations for tensioning belt 2 and does not require one of the engine components to be pivotally mounted as with belt tensioner 1. Belt tensioner 110 is similar in nearly all respects with respect to belt tensioner 1 except that outwardly curved arm 64 and U-shaped brackets 65 of lever 63 are replaced by a simple lever arm 113. Lever arm 113 is integrally connected with bearing housing 57 as is lever 63. An idler pulley 114 is rotatably mounted on the extended end of lever arm 113 by a stub shaft 115.

The hydraulic operation of modified belt tensioner construction 110 is very similar to that described above with respect to belt tensioner 1 and therefore is not described in detail. Hydraulic movement of shaft 52 by actuator 75 will pivot lever 113 moving pulley 114 in a belt tensioning direction to exert the predetermined tensioning force on belt 2 which is determined by valve assembly 100.

Third Embodiment

Another embodiment of the invention is shown in FIGS. 17-20 and is indicated generally at 120 and is shown diagrammatically in FIG. 17 tensioning drive belt 2. FIG. 17 shows a drive belt arrangement very similar to the arrangements shown in FIGS. 1 and 15. In particular, the arrangement shown in FIG. 17 is similar to that of FIG. 15 since belt tensioner 120 is mounted in a fixed position on the engine and includes an idler pulley which is moved into tensioning engagement with the drive belt. This arrangement eliminates the pivotal mounting of one of the vehicle accessories, such as alternator 7 in FIG. 1. Tensioner construction 120 is shown particularly in FIGS. 17-20 and includes the basic components, features and general operation of tensioners 1 and 110. Therefore, only the particular arrangement of the similar components is described in detail and not the components per se, reference being to the above description for the details of these components.

Tensioner construction 120 includes a housing 121 formed by lower semicylindrical-shaped outer housing wall 122 and a larger diameter nearly semicylindrical-shaped upper wall portion 123. A pair of radially extending walls 124 and 125 and a rear wall 126 integrally join walls 122 and 123 to form the remainder of housing 121. A shaft 127 which is similar to rotor 52 is rotatably or movably mounted within housing 121 by an elastomer block 128 similar to block 48. Block 128 is bonded to the outer surface of a cylindrical sleeve 129. Sleeve 129 is fixed against rotation by a pair of keys 130 which project into keyways 131 formed in an engine mounting bracket 132. A mounting bolt 133 is telescopically mounted within bore 134 of sleeve 129 for mounting belt tensioner 120 on bracket 132 which is located on the vehicle engine adjacent drive belt 2.

An actuator 135 similar to actuator 75 is mounted in the upper portion of housing 121 and engages shaft abutment lug 136 for hydraulically moving shaft 127. A pair of slide shims 137 and 138 is mounted between the end walls of actuator 135 and housing rear wall 126 and an arcuate-shaped radially extending surface 140 of shaft 127.

In accordance with the invention, shaft 127 includes a radially extending lever 142 which forms the lever means as do levers 63 and 113 of belt tensioners 1 and 110, respectively. Lever 142 is formed integrally at its base with the body of shaft 127 (FIG. 18) and has a generally axially extending recess 143 in which is mounted a needle 144. Needle stem 145 projects through an opening 141 formed in the end wall of actuator 135 for supplying hydraulic fluid to the hydraulic chamber 146 formed by actuator 135. Needle 144 is retained within recess 143 by a plug 147.

A self-contained fluid supply and pump assembly, indicated generally at 150, is mounted on the upper end of lever 142. Assembly 150 includes a main body 151, preferably formed of a metal casting which is integrally connected to or formed with the upper end of lever 142. Lever 142 also is integrally connected with shaft 127, forming a single one-piece member, as shown particularly in FIG. 18. Body 151 is formed with a cylindrical-shaped bearing housing 152 having a central bore 153 in which is mounted a bearing unit 154. An idler pulley 155 is rotatably mounted on body 151 by a shaft 156, which is rotatably mounted within bearing 154. A gear pump cavity 159 is formed in the opposite end of main body 151 from bearing housing 152. A gear pump 160, similar to gear pump 28, is mounted in cavity 159 and is retained therein by an end pressure plate 161. Gear pump 160 is drivingly connected to the inner end of pulley shaft 156 by a stub shaft 162. A reservoir forming end cap 163 is mounted on body 151 by a pair of retaining rings 164. End cap 163 is spaced from body 151 and forms a fluid reservoir 165 therebetween which communicates with pump 160.

Figure 20:
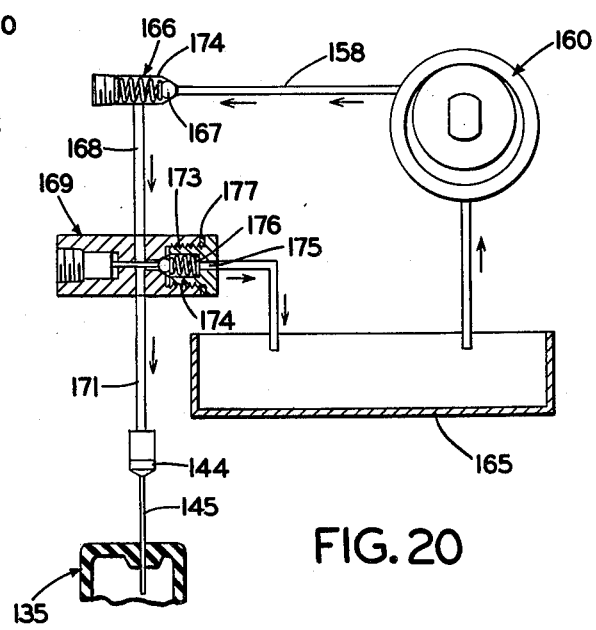
FIG. 20 is a diagrammatic view showing the hydraulic fluid flow and check valve system of the tensioner construction shown in FIGS. 17-19.

The hydraulic actuation of tensioner construction 120 is similar to that described above with respect to tensioner construction 1, and is shown diagrammatically in FIG. 20. Drive belt 2 is operatively engaged with idler pulley 155 to rotate the same when the vehicle engine is running. Pulley 155 actuates pump 160 through shafts 156 and 162 which pumps hydraulic fluid from reservoir 165 into a ball check valve assembly 166 through a fluid passage 158. The hydraulic fluid raises ball valve 167 and flows through a passage 168 formed in main body 151, and into a high-pressure/manual relief valve assembly 169, which is similar to valve assembly 100. This incoming fluid will flow through valve assembly 169 and through a fluid passage 171 which is formed in and extends throughout lever 142. This fluid then will flow through air needle 144 and stem 145 into hydraulic chamber 146 to inflate actuator 135. Inflation of actuator 135 will rotate actuator bar 136 and shaft 127, pivotally moving lever 142 in a belt tensioning counterclockwise direction (FIG. 17) to tension belt 2 by engagement with idler pulley 155.

When the predetermined hydraulic pressure is exerted on actuator bar 136 by actuator 135, relief valve 173 of valve assembly 169 will open, whereby the hydraulic fluid in passage 168 will pass through valve cavity 174 and through discharge line 175 into fluid reservoir 165. Valve spring 176 of relief valve 169 again determines the amount of pressure to be applied to actuator 135 and can be replaced with a spring having a different characteristic to change this pressure or by use of adjustment shims 177, similar to adjustment shims 104 of relief valve assembly 100.

IN GENERAL

The improved belt tensioner constructions 1, 110 and 120 provide a device which maintains a nearly constant pressure or tensioning force on endless drive belt 2 while the engine is running by use of hydraulic fluid supplied from a self-contained fluid supply, thereby eliminating use of the vehicle's hydraulic fluid. The improved belt tensioner enables a sufficient preload or pretensioning force to be applied to the belt when the engine is not running by elastomer blocks 48 and 128. This eliminates the use of metallic springs and the problems which can result from their use. The improved belt tensioner construction provides a unit which tensions the belt by use of a pivotally mounted idler pulley movable against the belt or else by pivotally mounting one of the vehicle accessories, thereby providing flexibility in use and choice of belt drive systems by the vehicle manufacturers.

The particular check valve arrangement of tensioners 1, 110 and 120 ensures that the desired amount of hydraulic fluid and pressure is always available in the actuator chamber since the pumping unit continuously creates a supply of high-pressure fluid in the chamber during engine operation. Also, this fluid will be supplied to the actuators only when necessary and usually will flow through the check valves back into the fluid supply reservoirs. Check valve ball 97 and valve assembly 166 trap the hydraulic fluid in the inflated actuators 75 and 135 when the engine is shut off. Therefore, the actuators will remain inflated to exert the full amount of pressure on their respective actuator bars, and correspondingly on drive belt 2, even when the engine is off. The hydraulic fluid will not drain from the hydraulic actuating member during engine shut off, as in many prior art hydraulic tensioner constructions. This trapped hydraulic fluid provides a damping effect at all times to the tensioning member to prevent whipping of the belt during sudden engine acceleration, deceleration and start-up. The pretensioning force supplied by elastomer blocks 48 and 128 will maintain sufficient tension on belt 2 for satisfactory accessory operation, even should leaks develop in the hydraulic system which could result in decrease in pressure in the actuators during engine shut off.

Accordingly, the improved belt tensioner and its arrangements provides a construction which is simplified, effective, safe and inexpensive, which achieves all of the enumerated objectives, provides for eliminating difficulties encountered with prior tensioning devices, and solves problems and obtains new results in the art.

In the foregoing description, certain terms have been used for brevity, clearness and understanding but no unnecessary limitations are to be implied therefrom beyond the requirements of the prior art, because such terms are used for descriptive purposes and are intended to be broadly construed.

Moreover, the description and illustration of the invention is by way of example, and the scope of the invention is not limited to the exact details of the construction shown or described.

Having now described the features, discoveries and principles of the invention, the manner in which the improved belt tensioner construction is constructed, assembled and operated, the characteristics of the new construction, and the advantageous, new and useful results obtained; the new and useful structures, devices, elements, arrangements, parts, and combinations are set forth in the appended claims.

We claim:

1. A belt tensioner construction for automatically tensioning an endless belt of a drive system for vehicle accessories, said tensioner construction including:
   (a) a housing;
   (b) shaft means movably mounted within the housing, said shaft means having a lever portion extending outwardly from said housing adapted to operatively engage the endless drive belt and apply a tensioning force on said belt when the lever portion is moved in a belt-tensioning direction;
   (c) elastomer means mounted within the housing and engageable with the shaft means biasing the lever portion of the shaft means in a belt tensioning direction;
   (d) expandable bladder means mounted within the housing and engageable with the shaft means;
   (e) a fluid supply communicating with the bladder means; and
   (f) pump means for supplying fluid to the bladder means under pressure to expand said bladder means into engagement with the shaft means to move the shaft means and the lever portion of the shaft means in the belt tensioning direction.

2. The construction defined in claim 1 in which the elastomer means is a member formed of an elastomeric material having an elongated annular configuration formed with a central bore and an outer surface defined by a plurality of flat areas.

3. The construction defined in claim 1 in which the pump means includes a shaft having an idler pulley and a gear pump mounted thereon; and in which the idler pulley is adapted to be engaged with and driven by the endless drive belt for rotating the pump shaft to operate the gear pump to pump fluid from the fluid supply into the bladder means.

4. The construction defined in claim 3 in which the gear pump consists of an inner and outer toothed member with the inner member having one less tooth than the outer toothed member; and in which the inner member is rotatably mounted within the outer member.

5. The construction defined in claim 1 in which check valve means is operatively connected between the fluid supply and the bladder means to block the flow of fluid from the bladder means back toward the fluid supply.

6. The construction defined in claim 1 in which the bladder means is formed by pairs of spaced end walls and side walls and by spaced top and bottom walls forming a fluid-receiving chamber therebetween; and in which certain of said walls are formed with pleats permitting outward expansion of said certain walls when the chamber fills with hydraulic fluid.

7. The construction defined in claim 6 in which an opening is formed in one of the bladder means walls; and in which a needle stem extends through said wall opening for injecting hydraulic fluid into the bladder means.

8. The construction defined in claim 1 in which the elastomer means is an elastomer member having a tubular configuration with an interior bore and an outer surface; in which the shaft means is telescopically fixedly mounted on the outer surface of the elastomer member; in which sleeve means extends through the bore of the elastomer member and is bonded thereto; and in which the sleeve means is adapted to be mounted in a fixed nonrotatable position on the engine whereby the shaft means is rotated to a preload belt tensioning position placing the elastomer member in stress.

9. The construction defined in claim 1 in which the pump means and fluid supply is mounted on the lever portion and is movable with the lever portion in a belt tensioning direction; and in which the pump means has an idler pulley which is engageable with the drive belt to tension the drive belt and to operate the pump means.

10. The construction defined in claim 9 in which a fluid passage is formed in the lever portion and extends between and communicates with the pump means and bladder means.

11. The construction defined in claim 10 in which relief valve means communicates with the fluid passage of the lever portion and the fluid supply to permit return of hydraulic fluid discharged by the pump means to the fluid supply upon a predetermined pressure being achieved in the expandable bladder means.

12. The construction defined in claim 1 in which the lever portion includes a bracket for mounting a vehicle accessory thereon.

13. The construction defined in claim 1 in which an idler pulley is mounted on an extended end of the lever portion for tensioning engagement with the drive belt when the lever portion is moved in a belt tensioning direction.

14. The construction defined in claim 1 in which the shaft means includes an annular base having a central bore; in which the elastomer means is telescopically mounted within the bore of the shaft means and fixed thereto; and in which the shaft means includes radially outwardly extending bar means engageable by the bladder means to rotate the shaft means when the bladder means is inflated by the hydraulic fluid.

15. A belt tensioner construction for automatically tensioning an endless belt of a drive system for vehicle accessories, said tensioner construction including:
   (a) a housing;
   (b) shaft means movably mounted within the housing, said shaft means having a lever portion extending outwardly from said housing adapted to operatively engage the endless drive belt and apply a tensioning force on said belt when the lever portion is moved in a belt tensioning direction;
   (c) expandable bladder means mounted within the housing and engageable with the shaft means;
   (d) a fluid supply communicating with the bladder means;
   (e) pump means adapted to be actuated by the endless belt of the drive system for supplying fluid to the bladder means under pressure to expand said bladder means into engagement with the shaft means moving the shaft means and the lever portion of the shaft means in the belt tensioning direction; and (f) valve means communicating with the fluid supply, pump means and bladder means to maintain a predetermined pressure in the bladder means thereby maintaining the bladder means in expanded engagement with the shaft means to maintain the belt tensioning force on the lever portion when the pump means is not being actuated by the endless belt.

16. The construction defined in claim 15 in which an elastomer member is mounted in the housing and is engageable with the shaft means; in which the elastomer member is placed in deformation whereby the elastic properties of the elastomer member bias the shaft means and lever portion in the belt tensioning direction.

17. The construction defined in claim 15 in which the pump means includes a pump and an idler pulley for driving said pump; in which the pump means and fluid supply is mounted within a second housing which is mounted on an extended end of the lever portion; and in which the idler pulley is adapted to be engaged with and driven by the drive belt for actuating the pump.

18. The construction defined in claim 17 in which a fluid passage is formed in the lever portion providing communication between the pump means and expandable bladder means.

19. The construction defined in claim 18 in which valve means communicates with the fluid passage of the lever portion and the fluid supply to permit return of hydraulic fluid discharged from the pump means to the fluid supply upon a predetermined pressure being achieved in the expandable bladder means.

* * * * *

UNITED STATES PATENT AND TRADEMARK OFFICE
CERTIFICATE OF CORRECTION

PATENT NO. : 4,299,583

DATED : November 10, 1981

INVENTOR(S) : Derald H. Kraft and Daniel M. Rinaldo

It is certified that error appears in the above-identified patent and that said Letters Patent are hereby corrected as shown below:

Column 3, line 6, change "Deral" to -Derald-

Column 7, line 24, change "rotor" to -shaft-

Column 7, line 50, change "walls" to -balls-

Column 11, line 2, change "rotor" to -shaft-

Signed and Sealed this

Twenty-sixth Day of January 1982

[SEAL]

Attest:

*Attesting Officer*

GERALD J. MOSSINGHOFF

*Commissioner of Patents and Trademarks*